Aug. 27, 1963  G. W. GOTTULA  3,101,554
ALL-DIRECTION LEVEL
Filed May 9, 1961

INVENTOR.
G. W. GOTTULA
BY *Hiram A. Sturges*
  *Agent*

United States Patent Office 3,101,554
Patented Aug. 27, 1963

3,101,554
ALL-DIRECTION LEVEL
Gerard W. Gottula, Steinauer, Nebr.
Filed Mar. 9, 1961, Ser. No. 94,519
1 Claim. (Cl. 33—212)

This invention relates to levels and more particularly it is an object of this invention to provide a level of a kind which indicates the degree a flat surface on which the level is placed is tipped in any direction throughout 360 degrees.

Heretofore such levels have been conceived and one such level is shown in the Patent #988,637, entitled, "Level," issued April 4, 1911, to F. Graul.

Levels of this type in the prior art have been made on the principle of having their interior substantially entirely filled with liquid whereby a small bubble is left which tends to seek the center of the top of the level since the top of such a level has a curved undersurface for this purpose. Such levels have had a very limited use because of the cost of their assembly because they need to be filled very accurately so that only a small bubble remains.

It is my concept to provide a level which also has a container for its liquid in which, however, it is the bottom surface which is convex on its upper side and in which colored fluid does not fill the container quite as high as the top of the upper side of the curved bottom. With this construction, the inner edge of the fluid describes a circular arc as seen through the container and the upper side of the bottom of the container is preferably marked with a circle of approximately the same size as the circle as described by the inner edge of the fluid whereby the latter circle can be compared with the marked circle to determine the amount a surface is level.

With my construction, the amount of liquid inserted can vary within sizable limits and yet operation is effective as the marked circle and the liquid edged circle need not meet.

A further object is to provide a container as described with a convex bottom which has a top which is concave on the underside for the purpose of preventing the leveling fluid from forming small droplets on the cover which would obscure the vision, a purpose different from the concave undersurface of the top in the above mentioned patent. My curved top is only present when the amount of liquid is substantially below the top of the container over the entire area of the top.

A further object is to provide a level, the container of which is of simple and economical construction.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

Figure 1:
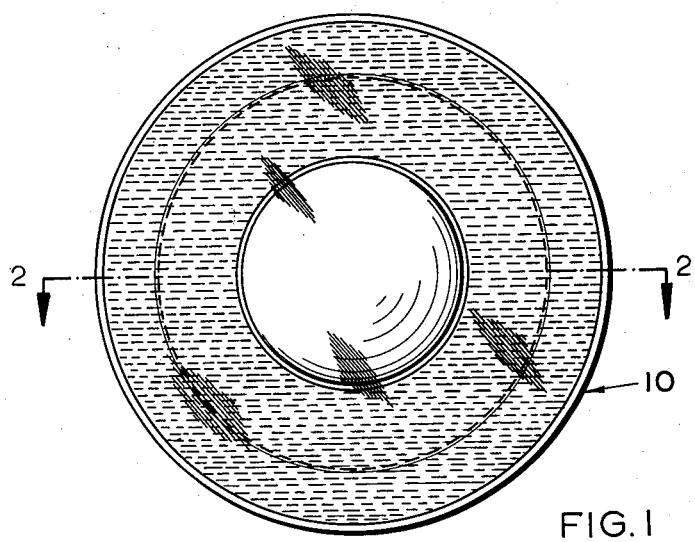
FIGURE 1 is a top view of the device.
Figure 2:
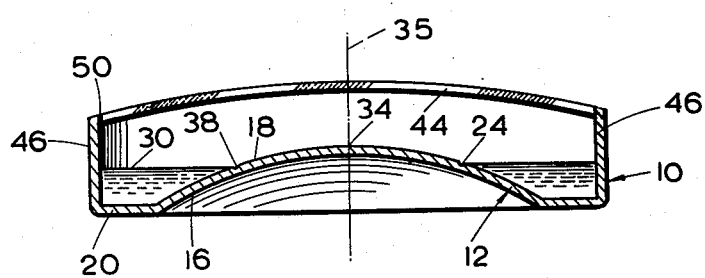
FIGURE 2 is a sectional view of the device taken along line 2—2 in FIGURE 1.
Figure 3:
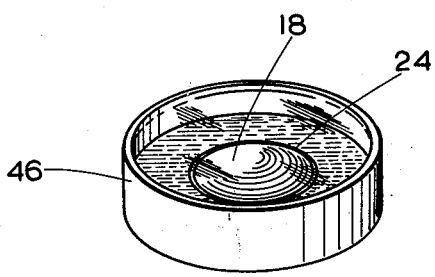
FIGURE 3 is a perspective view of the device.

The level of this invention is best seen at 10 in FIGURE 1 and has a bottom 12. The bottom 12 is concave on its under side in center portion as seen at 16 for saving of material and is convex at its upper side as seen at 18 for a purpose later described.

The outer perimeter of the bottom 12 preferably lies in a single plane adapted normally to be horizontal and the bottom-most parts of the bottom 12, which are preferably the undersurface areas of the perimeter portion 20, are disposed in a single plane for holding the container in a level and upright position on a level horizontal surface.

The upper surface 18 of the bottom 12 has a circle or annular line 24 marked on it, and lying in a plane disposed parallel to, but spaced above, the above first mentioned plane of the bottom-most perimeter portion 20 of the bottom 12.

Liquid 30 is disposed in the container and partially fills the container and is preferably disposed at a height normally substantially below the uppermost part 34 of the upper side 18 of the bottom 12 whereby the inner edge 38 of the liquid defines a circle because the convex upper surface 18 of the center portion 16 of the bottom is symmetrical on all sides about an axis 35, which axis is an imaginary perpendicular line through the center of the center portion 16 of the bottom, that is to say perpendicular, provided that the level is itself on a horizontal surface. The circle 38 defined by the edge of the liquid 30 is normally sufficiently close to the marked circle 24 as to facilitate discernment by an operator's eye of the relationship of the two circles 24 and 38 as regards their concentricity.

It is particularly important that portions of the upper side 18 of the convex bottom which are adjacent the marked circle 24 and which lie in the same horizontal plane when the level is in a level horizontal position be concentric about the above described vertical axis 35, because it is this structure that causes the inner edge 38 of the liquid 30 to be in a circular configuration. It is preferable that the upper side 18 lie on the edge of a portion of a sphere having its center a substantial distance below the level and on the axis 35.

The level 10 further has a cover 44 attached to its sides 46 for retaining the liquid 30. It is important that the cover 44 be transparent so that the liquid inner edge 38 can be seen as well as the marked circle 24.

It is also important that the cover 44 have an undersurface which is concave in the area generally above the marked circle 24 so as to permit the liquid 30 to drop back downwardly from the underside of the cover, whereby it does not interfere with the vision through the cover.

The sides 46 are preferably integral with the bottom 12 and are attached to the outer edge of the bottom-most perimeter portion 20 of the bottom 12. The cover 44 is preferably attached by bonding material 50 to the inner edge of the top of the sides 46.

The liquid is preferably a colored liquid of a different color than the bottom 12 so that its inner edge is visible thereon.

It will be seen that the center portion of the upper side of the bottom 12 is shown at 18 and that this center portion is convex and further that this center portion need not necessarily be of a shape of a portion of a sphere, nor need it necessarily be round in cross-section, although it is preferred that it be round in cross-section. In other words, the upper surface 18 can be convex, but of other shapes so long as it is symmertical about an axis disposed perpendicularly through the center of the center portion 18 at times when the level is disposed on a horizontal surface and also it is important that the shape of the upper convex surface 18 be of a horizontal cross-section in the area of the marked annular line 24 of substantially the same shape as the marked annular line 24 whereby it is possible for an operator to visibly determine whether the visible annular edge of the liquid 38 is in registry with or in parallelism with the marked annular line 24 so as to make possible the determining if the level is on a level surface.

The operator will be able to quickly see what adjustment need be made in the surface the level is on in order to bring that surface into a level position.

As thus described, it will be seen that this invention has fulfilled the objects above set forth.

From the foregoing description, it is thought to be obvious that an all-direction level constructed in accordance with my invention is particularly well adapted for use, by reason of the convenience and facility with which it may be assembled and operated, and it will also be obvious that my invention is susceptible of some change and modification without departing from the principles and spirit thereof, and for this reason, I do not wish to be understood as limiting myself to the precise arrangement and formation of the several parts herein shown in carrying out my invention in practice, except as claimed.

I claim:

A level comprising: a container the bottom-most parts of which lie in a single plane for holding the container in a level and upright position on a level horizontal surface, said container having an annular sidewall, said container having a bottom, outer edges of which are attached to said sidewall to form a liquid-tight closure, the center portion of said bottom being substantially convex on its upper side as seen in side elevation, a cover forming a part of said container attached to said sidewall and sealing the upper side of said container, said cover being transparent, marking means on the convex portion of the bottom of said container and in fixed relationship thereto, said marking means marking an annular line visible from the top of said cover, said annular line lying in a plane disposed parallel to and spaced above said first mentioned plane, liquid partially filling said container, the upper surface of said center portion of said bottom in a critical area adjacent said marked line being inclined acutely with respect to the horizontal as seen in side elevation and further being symmetrical about an axis disposed perpendicularly through the center of said center portion of said bottom at times when said level is disposed on an exactly horizontal surface and still further being of a horizontal cross-section substantially of the same shape as said annular marked line, said liquid being disposed at a height normally substantially below the uppermost part of the upper side of said bottom whereby the inner edge of said liquid defines an annular edge visible from the top of said level, said liquid edge being normally sufficiently close to said marked annular line as to facilitate discernment by the operator's eye of the relationship of the marked line and of the liquid edge to determine if the level is on a level surface.

References Cited in the file of this patent
UNITED STATES PATENTS
1,291,230    Stitzel _____ Jan. 14, 1919